W. G. SCHAEFER.
Curry-Comb.

No. 223,864. Patented Jan. 27, 1880.

Witnesses:
Fred. G. Dieterich
J. R. Littell

Inventor,
Wm. G. Schaefer,
by
C. A. Snow & Co.
Atty's

UNITED STATES PATENT OFFICE.

WILLIAM G. SCHAEFER, OF GOSHEN, INDIANA.

CURRY-COMB.

SPECIFICATION forming part of Letters Patent No. 223,864, dated January 27, 1880.

Application filed August 16, 1879.

*To all whom it may concern:*

Be it known that I, WM. G. SCHAEFER, of Goshen, in the county of Elkhart and State of Indiana, have invented certain new and useful Improvements in Curry-Combs; and I do hereby declare that the following is a full, clear, and exact description of the invention, which will enable others skilled in the art to which it appertains to make and use the same, reference being had to the accompanying drawings, which form a part of this specification.

Figure 1:
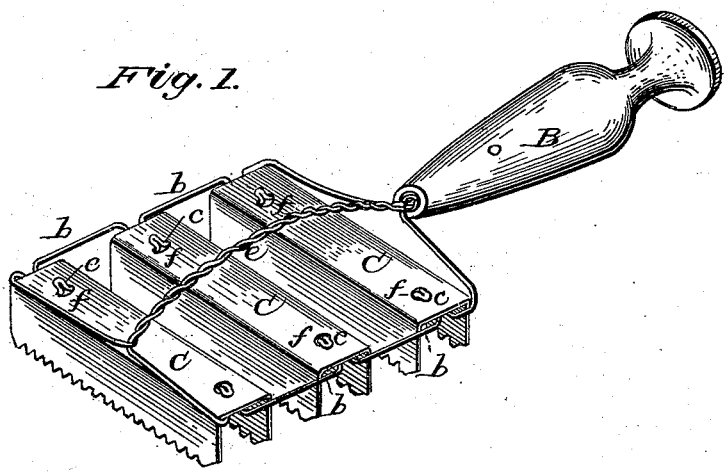
Figure 2:
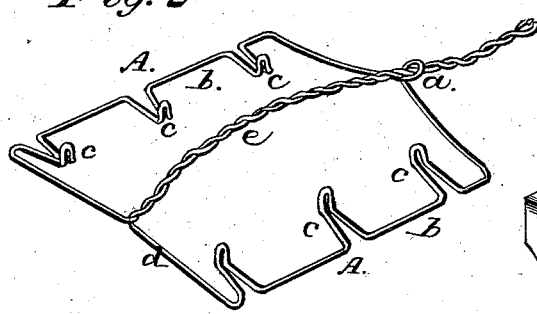
Figure 3:
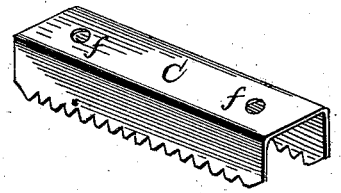

Figure 1 is a perspective view. Fig. 2 is a view of the wire frame detached, and Fig. 3 is a view of one of the combs detached.

Corresponding parts in the several figures are denoted by like letters of reference.

This invention relates to curry-combs; and it consists, essentially, in the construction of a continuous wire frame for the same, by which cheapness, durability, cleanliness, and other advantages are obtained.

I shall now proceed to fully describe my invention with reference to the drawings hereto annexed, in which—

A represents the wire frame, which may be made of steel or other wire of any suitable dimensions. In general outline the said frame is preferably made square or rectangular, and it is constructed in the following manner: Upon the center of the piece of wire, which is cut of suitable length, I first form a loop, $a$, at equal distances from which the ends of the wire are bent forward to form the sides $b\ b$ of the frame. Upon the said sides I form equidistant inwardly-projecting hooks $c\ c$, which may be three in number (more or less) on each side.

At the forward ends of the sides $b\ b$ the ends of the wire are bent toward each other to form the front side, $d$, of the frame. At the meeting-point the ends of the wire are twisted together to form a brace, $e$, which is carried back and passed through the loop $a$, after which its end is secured in the handle B.

The combs C C may be constructed in any suitable manner which will admit of their being attached to the frame in the manner shown in the drawings. By reference to these it will be seen that the backs of the combs are provided with perforations $f\,f$, by which they are adjusted upon the hooks $c\ c$ of the frame, after which the said hooks are bent back or clinched, so as to retain the combs securely in position.

Owing to the simplicity of its construction, my improved curry-comb may be manufactured at a very small expense. It is very durable, possesses great elasticity, by which injury to the horse is avoided, and the sides $b\ b$, which project beyond the ends of the combs, form strike-guards, which prevent the ends of the combs from tearing the skins of the animals.

Having thus described my invention, I claim and desire to secure by Letters Patent of the United States—

1. The frame A, formed of a single piece of wire, and provided with the loop $a$, hooks $c\ c$, and twisted brace $e$, as set forth.

2. The herein-described improved curry-comb, consisting of the frame A, having loop $a$, hooks $c\ c$, and brace $e$, passing through loop $a$, handle B, secured upon the end of brace $e$, and combs C, secured upon hooks $c\ c$, as set forth.

In testimony that I claim the foregoing as my own I have hereto affixed my signature in presence of two witnesses.

WILLIAM G. SCHAEFER.

Witnesses:
GEORGE S. TRAIN,
JOSEPH SHEFFER.